Dec. 28, 1965  K. KUPFERBERG ETAL  3,226,628
ALTERNATING CURRENT VOLTAGE/CURRENT REGULATED POWER SUPPLY
Filed Feb. 4, 1963  4 Sheets-Sheet 1

INVENTORS
JAIME ASH
KENNETH KUPFERBERG
BY
Alfred W. Barber
ATTORNEY

Dec. 28, 1965   K. KUPFERBERG ETAL   3,226,628
ALTERNATING CURRENT VOLTAGE/CURRENT REGULATED POWER SUPPLY
Filed Feb. 4, 1963   4 Sheets-Sheet 2

INVENTORS
JAIME ASH
KENNETH KUPFERBERG
BY
*Alfred W. Barber*
ATTORNEY

Dec. 28, 1965  K. KUPFERBERG ETAL  3,226,628
ALTERNATING CURRENT VOLTAGE/CURRENT REGULATED POWER SUPPLY
Filed Feb. 4, 1963  4 Sheets-Sheet 3

INVENTORS
JAIME ASH
KENNETH KUPFERBERG
BY
*Alfred W. Barber*
ATTORNEY

Dec. 28, 1965 K. KUPFERBERG ETAL 3,226,628
ALTERNATING CURRENT VOLTAGE/CURRENT REGULATED POWER SUPPLY
Filed Feb. 4, 1963 4 Sheets-Sheet 4

INVENTORS
JAIME ASH
KENNETH KUPFERBERG
BY
Alfred W. Barber
ATTORNEY

United States Patent Office 3,226,628
Patented Dec. 28, 1965

3,226,628
ALTERNATING CURRENT VOLTAGE/CURRENT
REGULATED POWER SUPPLY
Kenneth Kupferberg and Jaime Ash, Flushing, N.Y., assignors to Forbro Design Corp., New York, N.Y., a corporation of New York
Filed Feb. 4, 1963, Ser. No. 255,855
4 Claims. (Cl. 323—43.5)

The present invention concerns alternating current regulators and, in particular, servo motor regulators for providing regulated alternating current or voltage.

Alternating current line-voltage regulation has been provided by means of a mechanically variable auto-transformer driven by a servo motor which in turn is controlled by an error voltage derived by comparing the rectified output voltage of the regulator with a stable direct current voltage reference. A typical system of this kind is shown in United States Patent No. 2,949,592 and so no detailed description of the prior art systems will be necessary. However, it should be stated here that the primary object of the prior art devices is to provide a constant output voltage while the present invention is concerned with providing a wide range of regulated output voltage or current.

According to the present invention an improved type control circuit incorporating solid state devices is used including an improved method of controlling the phases of the servo motor drive current including a phase splitting device. Since the present invention has for one of its main objects the provision of adjustable output voltages and currents, the improved control circuit readily provides for changing the output of the system. The present invention utilizes a bridge circuit in which the output voltage is compared with a reference voltage, the difference or error signal from the bridge is amplified, the amplified signal is passed through a phase splitting circuit and the resultant is used to drive the servo motor control circuit. The servo motor operates a mechanically adjustable auto-transformer which adds to or subtracts from the input voltage from the power line.

In another form of the present invention the output current is sensed, transformed into a voltage proportional to the current, and utilized in the bridge to ultimately cause correction or adjustment of the input voltage as in the case of voltage sensing control described above.

In still another form of the present invention both output voltage and output current are sensed and the magnitude of one or the other utilized for control purposes.

In a still further form of the present invention an additional adjustable transformer is used at the input to the system and its control is ganged with the adjustable reference control in the bridge so that a wide range of output voltage or current may be obtained. Once the output voltage or current is adjusted to the desired value the the system regulates to maintain it constant at this desired value.

Accordingly one of the main objects of the present invention is to provide an improved control method and means in an alternating current regulator utilizing a servo motor controlled adjustable transformer.

Another object is to use a bridge circuit as the error sensing and output voltage or current determining means in such a system.

Still another object is to provide a bridge means for controlling the output voltage or current in an alternating current regulator over a wide range.

A further object is to provide two bridge means, one for controlling output voltage and the other for controlling output current in an alternating current regulator.

These and other objects of the present invention will be apparent from the detailed description of the invention given in connection with the various figures of the drawing.

Figure 1:
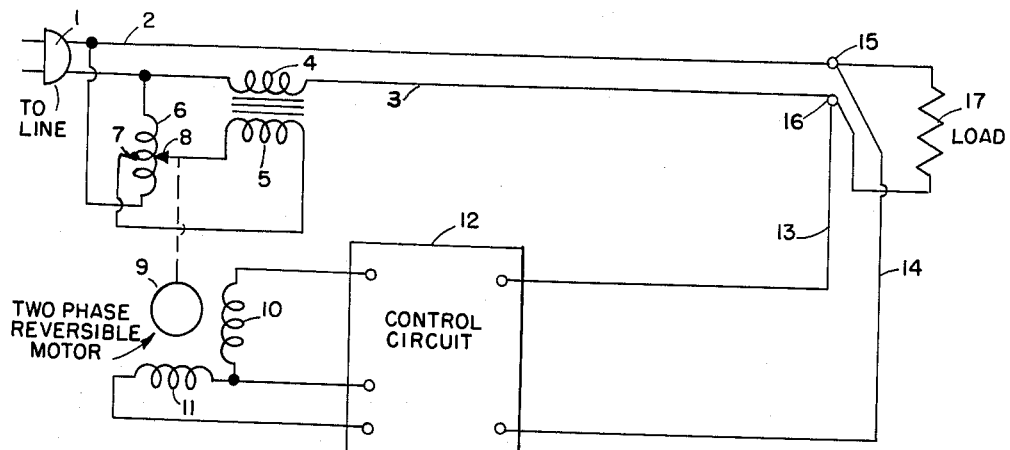
FIGURE 1 is a schematic circuit, partly in block form, of the prior art alternating current regulator.

FIG. 1 is a schematic circuit and block diagram of the basic prior art alternating current voltage regulator intended for providing a constant output voltage. A suitable power line connector such as plug 1 is connected over line 2 to an output load terminal 15 and through transformer secondary 4 and over line 3 to a second output load terminal 16. The load 17 to be supplied with alternating current power is connected across terminals 15 and 16. An adjustable autotransformer 6 having a center-tap 7 and an adjustable output contactor 8 is connected across the input power lines. The primary 5 of voltage corrector transformer 4–5 is connected between center-tap 7 and adjustable contactor 8 so that as contactor 8 is moved along its path on auto-transformer 6, a voltage is induced in secondary 4 which passes from a small in-phase correction voltage, through zero to a small out-of-phase correction voltage, in order to compensate changes in the input power line voltage, which may be either higher or lower than the desired regulated constant output voltage. The output voltage to be regulated is applied to control unit 12 over leads 13 and 14. While details are not shown, the control unit 12 will generally provide for rectifying the voltage received over leads 13 and 14 and for comparing the resulting direct current voltage with a constant direct current reference voltage 18. Depending on whether this comparison shows the output voltage at terminals 15–16 to be higher or lower than the predetermined desired output voltage, the phase angle between the voltages applied to coils 10 and 11 of the two phase reversible servo motor 9 will be varied causing this motor to rotate in one direction or the other. Motor 9 is coupled to and moves contactor 8 as indicated by the dash line causing the proper output compensating voltage to appear across secondary 4. Generally a two-phase servo motor with dynamic breaking is used as motor 9 and the exciting currents in coils 10 and 11 are varied in relative phase to control the torque of the motor. When the currents in coils 10 and 11 are at a zero-degree phase angle indicating that the output voltage of the system is exactly what was called for, the motor locks in a stationary condition. While not intended to limit the present invention to this type of motor, it will be used in illustrating the operation of the control circuit of the present invention.

Figure 2:
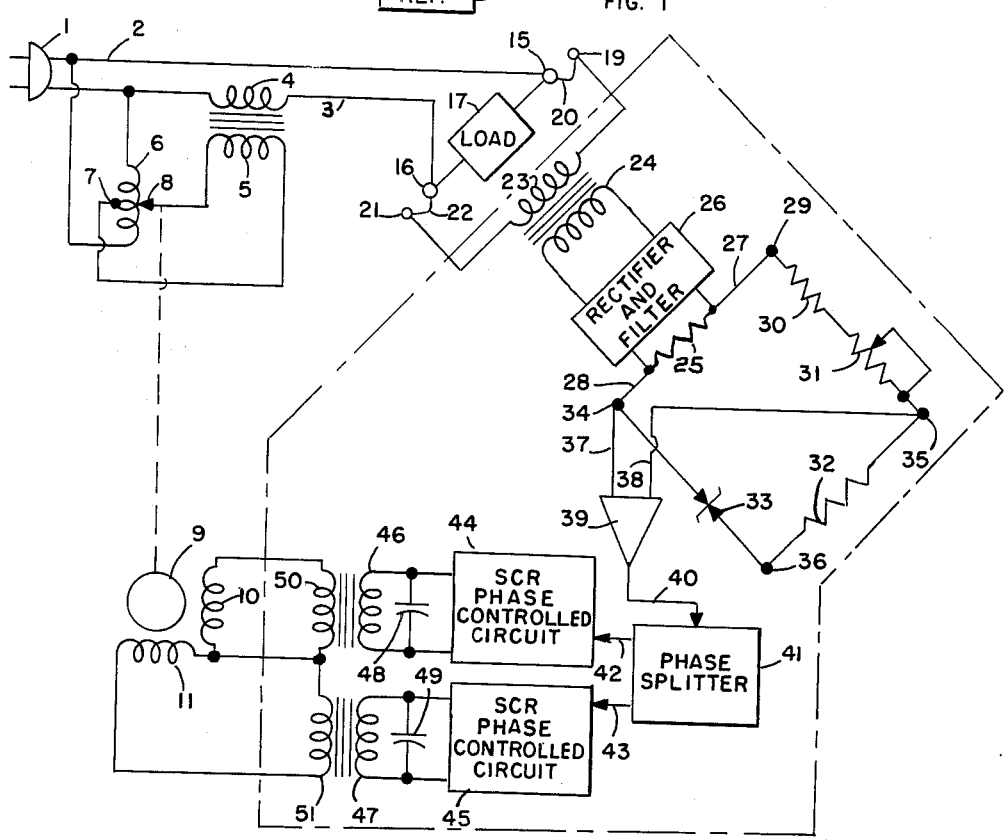
FIGURE 2 is a schematic circuit diagram, partly in block form, of one form of the present invention as a voltage regulator.

FIG. 2 illustrates one form of the present invention as applied to the servo-motor driven alternating current output voltage regulator of FIG. 1. In the case of FIG. 2 the load 17 is connected between terminals 15 and 16 which are joined to terminals 19 and 21 by links 20 and 22 respectively. The load voltage is applied to the bridge circuit formed between terminals 29, 34, 35 and 36 by means of isolation transformer 23–34 and after rectifier and filter 26 loaded by resistor 25. When the load is located at a remote point so that there is appreciable voltage drop in the connecting leads, links 20 and 22 may be opened and the voltage sensing circuit may then be connected directly across the load for compensating this lead drop. Rectifier and filter 26 provide a direct current between leads 27 and 28 which is equal to or proportional to the alternating current voltage across the load 17 and which is applied between terminals 29 and 34 as one arm of the bridge. The second arm of the bridge connected between terminals 34 and 36 is a reference voltage which may be, for example, Zener diode 33 supplied from a suitable source of current, not shown, so as to provide a constant reference voltage. A reference resistor 32 is connected between terminals 35 and 36 and an adjustable output voltage control resistor consisting of a fixed resistor 30 in series with adjustable resistor 31 is connected between terminals 35 and 29 completing the bridge. An amplifier 39 froming part of the error sensing and control circuit is connected over leads 37 and 38 to diagonal terminals 34 and 35 respectively. The control circuit operates, as will be further described in detail below, to maintain terminals 34 and 35 at substantially the same potential, or in other words, at zero error signal between them. When this is done, the ratio of the reference voltage between terminals 34 and 36 to the system output porportional voltage between terminals 34 and 29 is equal to the ratio of the reference resistance between terminals 35 and 36 to the output voltage control resistance between terminals 35 and 29. The circuit of FIG. 2 is adapted to a constant output regulator or one having a small range of adjustment. Thus, adjustable resistor 31 may be used to trim the output voltage to an exact desired value or to vary the output voltage over a predetermined range.

The amplified control or error voltage from amplifier 39 is utilized to eventually control motor 9 and in turn move adjustable contact 8 to provide an exact compensating voltage to be induced across secondary 4 and to return the voltage across the load to its predetermined value. One way in which this control can be accomplished is illustrated by phase splitter 41 feeding phase controlled circuits 44 and 45 and finally through transformers 46–50 and 47–51 to apply phased current to windings 10 and 11 as will be described in detail in connection with the detailed circuit of FIG. 6. The output of amplifier 39 passes over lead 40 to phase splitter 41 the two phase output of which passes over leads 42 and 43 to the phase controlled circuits 44 and 45. The output of phase controlled circuits 44 and 45 is applied to primary 46 tuned by capacitor 48 to the frequency of the alternating current being regulated and to primary 47 tuned by capacitor 49. Secondaries 50 and 51 feed phase coils 10 and 11 respectively. The bridge and control circuitry included within the dashed line is shown in its preferred form and in detail in FIG. 6.

Figure 3:
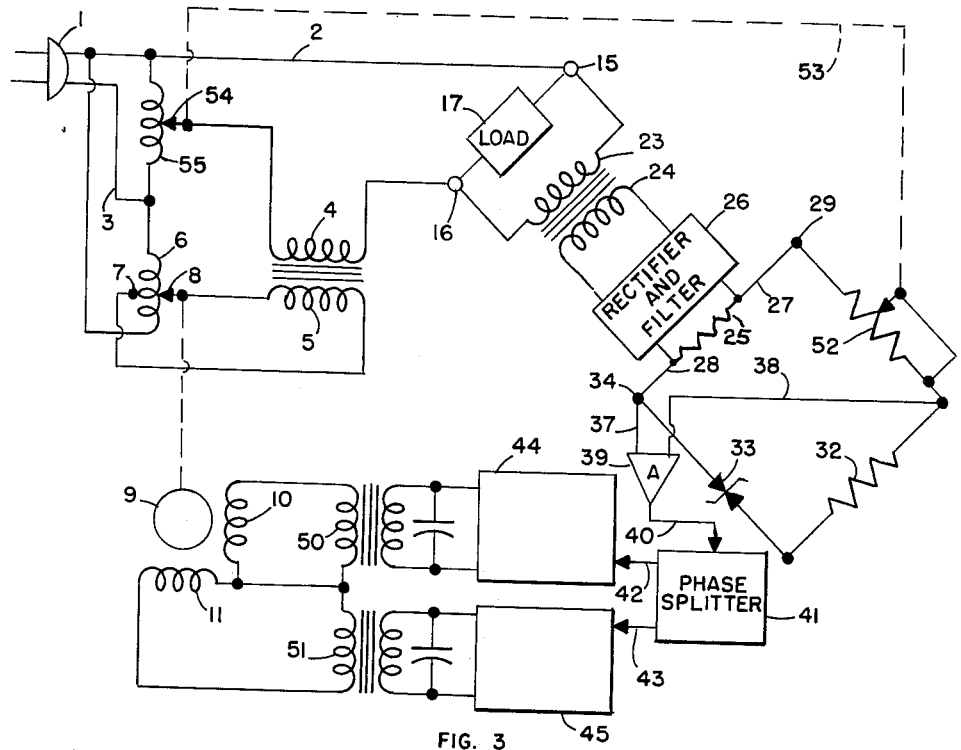
FIGURE 3 is a schematic circuit diagram, partly in block form, of a modified form of the present invention for providing a wide range of regulated output voltage.

FIG. 3 shows a regulator system which is similar to that shown in FIG. 2 and described above except for provision for a wide range of output regulated voltage and the same numbers are used to designate similarly functioning parts. The wide range of output voltage is obtained by means of an input adjustable auto-transformer 54 and a wide range adjustable control resistor 52 in the bridge circuit. The auto-transformer adjustable contact 54 is ganged with the adjustment means of resistor 52 as indicated by dashed line 53. In this way any output voltage from the maximum available from the power line down to substantially zero is provided and the system regulates to maintain the output voltage constant once it is selected as described above.

Figure 4:
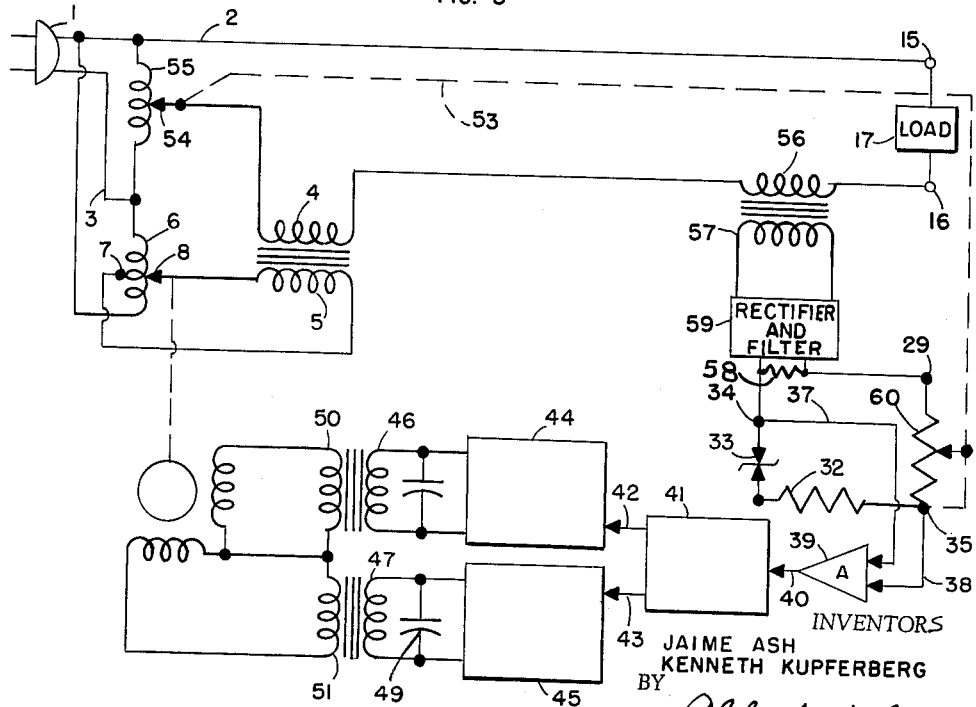
FIGURE 4 is a schematic circuit diagram, partly in block form, of a further modified form of the present invention adapted to regulating output current.

FIG. 4 shows how the system can be adapted to supply and regulate a wide range of output current. The system operates in a manner similar to that of FIG. 3 except that output current is sensed instead of output voltage and the system operates to regulate the output or load current. This output or load current is sensed and converted into a voltage which is proportional to this current as, for example, by means of transformer 56–57 feeding rectifier 59 loaded by resistor 58 and feeding bridge terminals 29 and 34. The output or load current flows through primary 56 and induces a proportional alternating current in secondary 57. The voltage across secondary 57 is applied to rectifier 59 resulting in a direct current voltage between terminals 29 and 34 which is proportional to the current flowing between load terminals 15 and 16. The resistor 60 between terminals 35 and 29 thus becomes in effect a current determining resistor since its value determines the voltage between terminals 29 and 34 which in turn is a measure of the output or load current. In this way a wide range of output current can be provided and once determined by the synchronous adjustment of transformer tap 54 and the value of resistor 60, it is regulated to a constant value.

Figure 5:
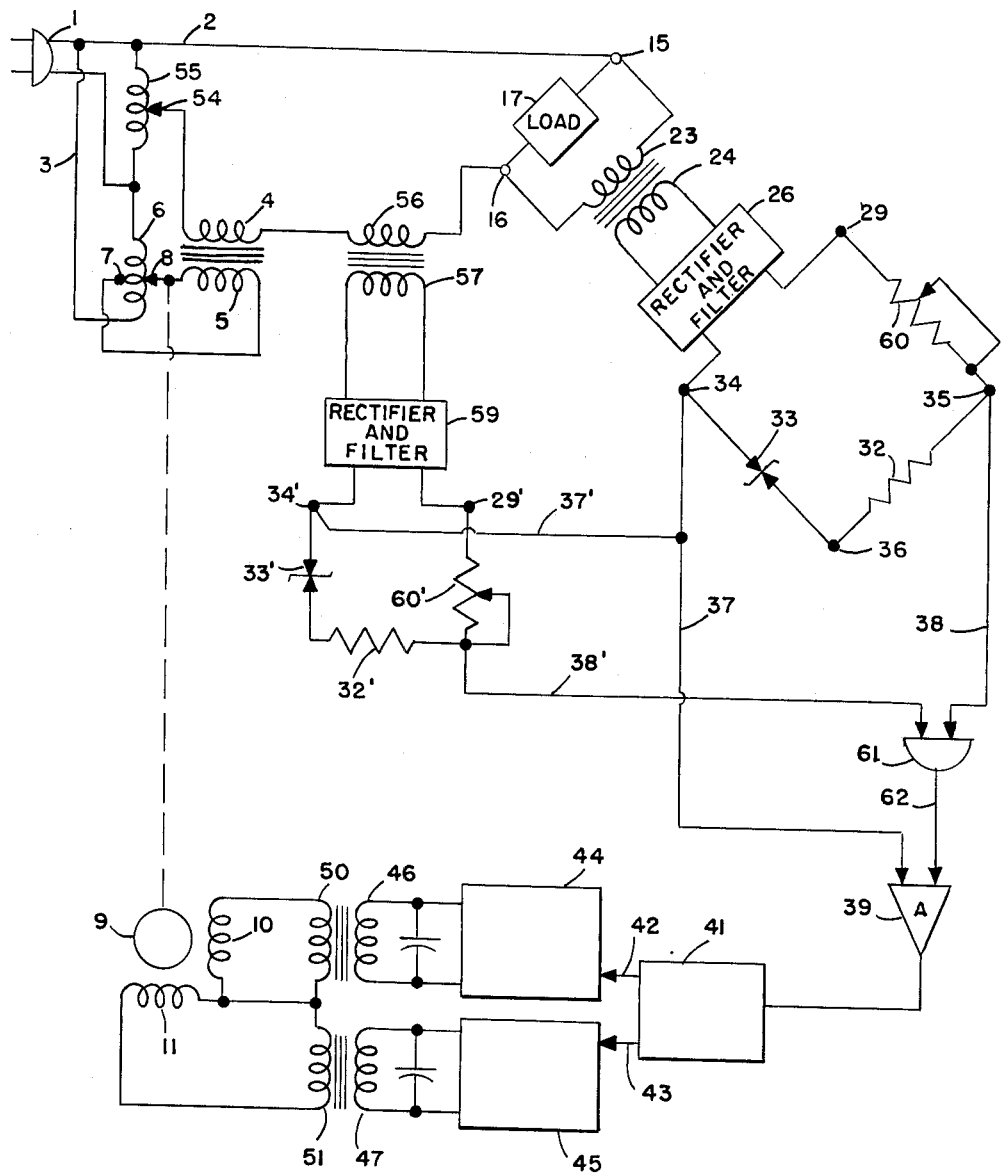
FIGURE 5 is a schematic circuit diagram, partly in block form, of a still further modified form of the present invention adapted to regulating both output current and output voltage.

FIG. 5 shows how voltage and current regulation can be combined to operate through a common control system, with automatic crossover from one to the other mode. A voltage control system as shown in FIG. 3 is used with a current control system as shown in FIG. 4. A system of this kind operates in one mode or the other under any given set of conditions, i.e. it operates to maintain constant voltage or constant current since it obviously cannot do both at the same time. As an example, suppose the voltage control 60 is set to call for a load voltage of 100 volts and the current control 60' is set to call for a load current of 1 amphere. Now, if the load is a 1000 ohm resistor, the system will regulate for voltage since 100 volts will not cause 1 ampere to flow in the 1000 ohm load. However, if the load is 10 ohms, the current control will take over reducing the current to 1 ampere and incidentally the voltage control system will lose control and the output voltage will drop to 10 volts.

In FIG. 5 the voltage control bridge is numbered to correspond with the numbering in FIG. 3 while the current control bridge is numbered as in FIG. 4 except the numbers are primed. In order to pass the predominating control or error signal on to amplifier 39 and the rest of the control circuit, the outputs of the voltage and current control bridges are applied to ANALOG OR circuit 61 and the larger signal as selected is applied to amplifier 39 over lead 62.

Figure 6:
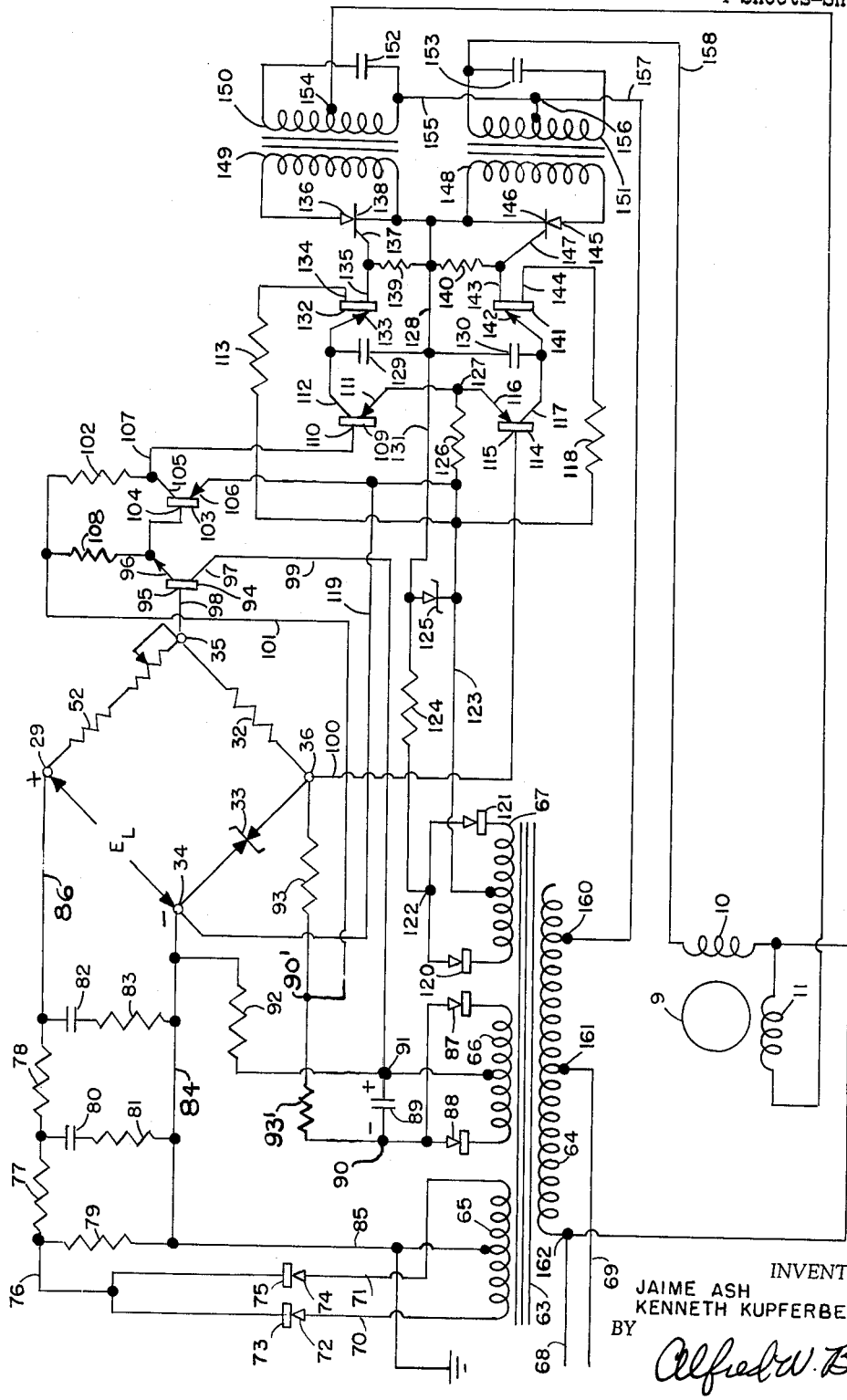
FIGURE 6 is a schematic circuit diagram of the preferred form of the regulator bridge and control circuit in detail.

FIG. 6 is a schematic circuit diagram of a preferred form of the bridge and control circuits. For example, this circuit includes all parts of a typical bridge and control circuit as included within the dashed box shown in FIG. 2 and would be similar to important and novel functional portions of the other figures and is particuliarly adapted to regulators which provide constant output voltage. A simple modification, however, adapts this circuit for use in regulators designed to provide constant output current or variable output voltage or current or both as will be pointed out below.

FIG. 6 begins with a pair of leads 68 and 69 to be connected across the output of the regulated supply and concludes with the regulating servo motor 9. The regulated power across leads 68 and 69 is applied to primary 64 of the transformer associated with core 63. Secondary 65 supplies voltage to the output sensing circuit which includes rectifiers and filter means. This secondary voltage across coil 65 is applied over leads 70 and 71 to rectifier 72–73 and 74–75 the rectified output from which is applied over lead 76 to a load resistor 79 followed by a filter consisting of series resistors 77 and 78 and shunt capacitors 80 and 82 in series with resistors 81 and 83 returned to lead 84. The lead 85 is returned to a center tap on coil 65. Resistor 79 is chosen to load the rectifiers and swamp the load and output of the filter so that the rectified voltage follows closely the average value of the alternating current voltage across coil 65 which in turn is proportional to the average of the regulator output voltage sensed across leads 68 and 69. This load sensed voltage, rectified and filtered is applied to bridge terminals 29 and 34 over leads 86 and 84.

The control bridge circuit includes the voltage $E_L$ (proportional to load voltage) to be controlled across terminals 29 and 34, the reference voltage established across reference Zener diode 33 connected between terminals 34 and 36, the reference resistor 32 connected between terminals 36 and 35, and the adjustable output control resistor 52 connected between terminals 35 and 29. A highly stabilized and constant voltage is provided by the voltage drop across Zener diode 33 since it is supplied with a substantially constant current through resistors 92, 93 and 93'. The center-tapped coil or winding 66 supplies a substantially constant voltage, since it is derived from the constant output voltage of the system. This constant voltage is rectified by rectifiers 87 and 88 and filtered by capacitor 89 to provide a substantially constant direct current voltage between terminals or points 90 and 91. Resistors 92, 93 and 93' which are chosen to be large enough to swamp any variation in load imposed by the Zener diode and the connected bridge circuit will then supply a substantially constant current to Zener diode 33 providing a highly stable and constant voltage thereacross. The bridge amplifier consists of the two stage, common collector, common emitter amplifier utilizing transistors 94 and 103. The input transistor has its base 95 connected over lead 98 to bridge terminal 35. The diagonal and common bridge terminal 34 is connected to common line 119. Transistor 94 which is designated as an NPN transistor is connected with its emitter 96 returned through load resistor 108 to negative voltage point 90' and its collector 97 is returned to positive voltage point 91. The second cascaded transistor 103 is shown as a PNP transistor and its base 104 is directly connected to emitter 96. Emitter 106 is returned to common line 119 and collector 105 is connected through load resistor 102 to negative voltage point 90'.

Following the amplifier just described is connected the phase splitter circuit. This circuit comprises transistors 109 and 114. Emitters 111 and 116 are connected together at terminal 127 and returned through common resistor 126 to reference line 119. Base 110 is connected to collector 105 over line 107 to receive the amplified error signals from the bridge. Base 115 is connected to a point of fixed reference potential which, in this case, is made conveniently over line 100 to bridge reference voltage terminal 36. This is a common emitter coupled circuit and the voltage of the emitters follows the voltage of base 110 of transistor 109. Thus, the emitter of transistor 114 is driven by a signal almost equal to that of base 110 of transistor 109, and therefore we obtain phase splitting or inversion, due to the inherent phase reversal between signals applied to an emitter, and those applied to a base.

Following this phase splitting circuit are two controlled rectifiers and their phase control circuits. These circuits utilize unijunction transistors 132 and 141 and controlled rectifiers 138 and 146. Unijunction transistor 132 is connected with base 134 connected through resistor 113 to common line 123 while unijunction transistor 141 is connected with base 144 connected through resistor 118 to this same common line 123. The bias for these unijunction transistors and their connected controlled rectifiers is provided by center-tapped coil 67 on core 63 and rectifiers 120 and 121 providing a negative voltage at point 122 and a positive voltage from the center-tap on line 123. The voltage at point 122 is unfiltered and hence will have the characteristic of a full wave rectified voltage without filtering, dipping to zero at every half cycle. This voltage is applied through series resistor 124 to Zener diode 125 resulting in a substantially constant voltage interrupted every half cycle by a sharp dip to zero. Unijunction transistor base 135 is returned through resistor 139 and base 143 through resistor 140 to negative line 131 from the bias source. Thus the unijunction transistors receive a substantially constant bias interrupted at each half cycle of the alternating current of the system. This interruption provides a convenient and synchronous resetting of the unijunction transistors. Emitter 133 is connected to collector 112 and to capacitor 129 which is returned to negative line 131 and emitter 142 is connected to collector 117 and to capacitor 130 which is returned to negative line 131. Each time unijunction transistor 132 fires the charge in capacitor 129 flows through transistor 132 and resistor 139. The drop across resistor 139 is applied to control electrode 137 of controlled rectifier 136 and causes it to fire. Similarly the firing of unijunction transistor 141 discharges capacitor 130 through resistor 140 and applies a firing voltage to control electrode 147. The rate at which capacitor 129 charges and hence the timing of the firing of transistor 132 depends on the net bias on transistor 109 which in turn depends on the error signal from the bridge as amplified and the relative bias conditions of transistors 114 and 109 as set forth above. Similarly, the charging of capacitor 130 and hence the firing of transistor 141 depends on the net bias on transistor 114 with respect to that on transistor 109. Transistors 132 and 141 are reset by the zero going pulses across Zener diode 125 on each half cycle as set forth above.

In this way controlled rectifiers 136 and 146 are fired in synchronism with the alternating current in the system and in relative phase relation which depends on the unbalance condition in the bridge. Controlled rectifier 136–138 is connected across winding 149 of transformer 149–150 and controlled rectifier 145–146 is connected across winding 148 of transformer 148–151. Now alternating current power for motor 9–10–11 is taken from taps 160 and 162 on winding 64. This power going to point 156 over lead 157 passes through at least a portion of winding 151 in going to motor winding 10 over lead 158 and through at least a portion of winding 150 over lead 155 and from point 154 in going to winding 11. Now, if windings 149 and 148 are shorted by the firing of rectifiers 136 and 146 at equal intervals and for equal portions of the alternating current cycle, equal impedances will be reflected in secondaries 150 and 151 and equal power will be applied to motor windings 10 and 11. Under these conditions motor rotor 9 will be dynamically locked and stationary since the system is in balance and requires no correction by motor 9. However, any error signal from the bridge is amplified and used to vary the relative conduction times of the controlled rectifiers, advancing one, and retarding the other. This will cause a net phase shift from 0° of the voltages applied to each motor winding, producing a torque proportional to that phase shift. The effect of this will be that motor 9 will move in the direction of restoring the balance previously described, and it will be locked in the position that minimizes the error.

As was stated above the single power transformer on core 63 connected to the regulated output is convenient and effective for a constant voltage output system. Where the output voltage is adjustable over a range or the output current is to be regulated, leads 68 and 69 will be coupled to the input power line. Only winding 65 which is the sensing winding will be coupled to the output or, in the case of current regulation, to a coil in series with the output, and in this case, it will be necessary to provide additional regulation ahead of the Zener reference, to keep its operating point from changing.

While only a few forms of the present invention have been shown and described, many modifications will be apparent to those skilled in the art and within the spirit and scope of the invention as set forth, in particular, in the appended claims.

What is claimed is:

1. In an alternating current wide range voltage regulator, the combination of;

an input circuit,
an output circuit,
two phase motor controlled voltage changing means coupled between said input circuit and said output circuit for varying the transfer of voltage from said input to said output circuit,
rectifying means coupled to said output circuit for providing direct current voltage proportional to the alternating current voltage across said output circuit,
a voltage comparison bridge including said direct current voltage in one of its arms and a wide range adjustable reference voltage in another of its arms for comparing said direct current voltage with said reference voltage and to provide an error signal substantially equal to their difference,
an amplifier coupled to said bridge for amplifying said error signal,
a phase splitting circuit coupled to said amplifier to receive said amplified error signal for providing a two phase signal in response to said amplified error signal,
and alternating current phase control means coupled between said phase splitting circuit and said motor for controlling said motor in accordance with said phase split amplified error signal to control said motor whereby the transfer of voltage from said input circuit to said output circuit is controlled in a manner to tend to reduce said error signal toward zero.

2. In an alternating current wide range current regulator, the combination of,
an input circuit,
an output circuit,
two phase motor controlled voltage changing means coupled between said input circuit and said output circuit for varying the transfer of voltage from said input to said output circuits,
rectifying means responsive to current flowing between said input circuit and said output circuit for providing a direct current voltage proportional to said alternating current flow,
a voltage comparison bridge including said direct current voltage in one of its arms and a wide range adjustable reference voltage in another of its arms for comparing said direct current voltage with said reference voltage and to provide an error signal substantially equal to their difference,
an amplifier coupled to said bridge for amplifying said error signal,
a phase splitting circuit coupled to said amplifier to receive said amplified error signal for providing a two phase signal in response to said amplified error signal,
and alternating current phase control means coupled between said phase splitting circuit and said motor for controlling said motor in accordance with said phase split amplified error signal to control said motor whereby the transfer of voltage from said input circuit to said output circuit is controlled in a manner to tend to reduce said error signal toward zero.

3. An alternating current wide range voltage regulator as set forth in claim 1 and including additional adjustable voltage control means connected between said input circuit and said output circuit and including adjustment means ganged with the adjustment means of said adjustable reference.

4. An alternating current wide range current regulator as set forth in claim 2 and including additional adjustable voltage control means connected between said input circuit and said output circuit and including adjustment means ganged with the adjustment means of said adjustable reference.

References Cited by the Examiner

UNITED STATES PATENTS

| 2,830,255 | 4/1958 | De Blasio | 323—45 |
| 2,913,657 | 11/1959 | Erickson | 323—43.5 |
| 2,961,597 | 11/1960 | Carleton | 323—43.5 X |
| 2,966,626 | 12/1960 | Kalina et al. | 323—45 |
| 3,068,395 | 12/1962 | Perrins | 323—45 |
| 3,106,675 | 10/1963 | Riebs et al. | 323—43.5 |

LLOYD McCOLLUM, *Primary Examiner.*

W. E. RAY, J. M. THOMSON, *Assistant Examiners.*